J. R. WEATHERSBY.
FARM LEVEL.
APPLICATION FILED JAN. 15, 1920.
1,346,619.
Patented July 13, 1920.
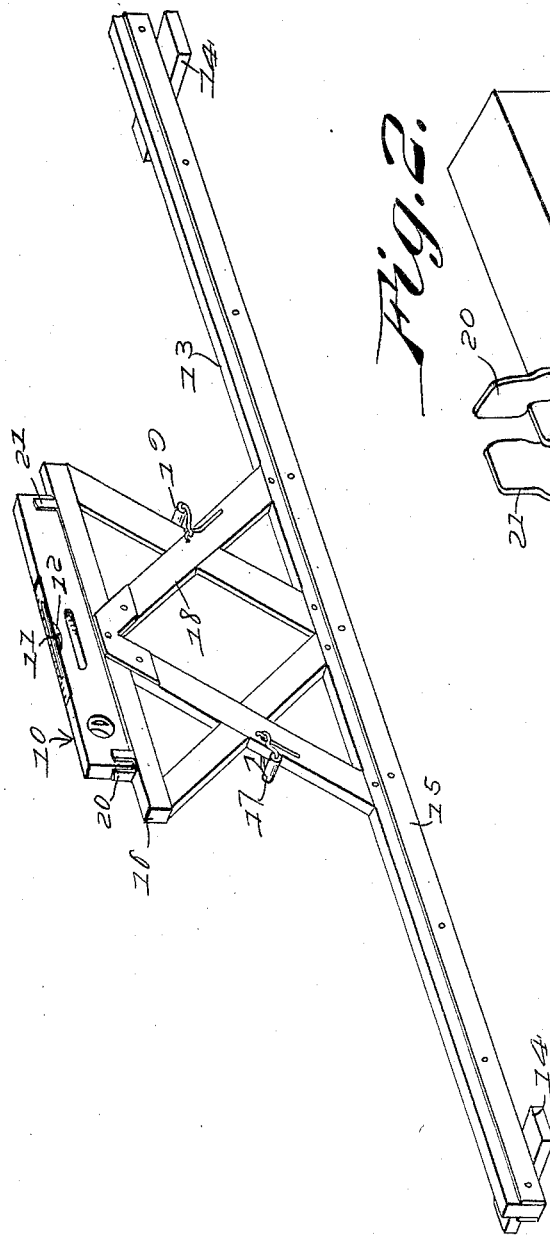
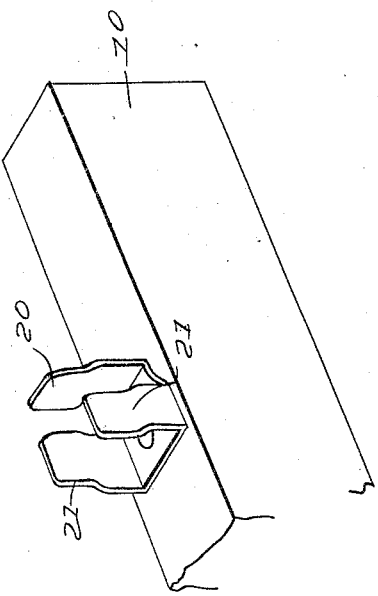
Inventor
J. R. Weathersby,
By
Attorney

UNITED STATES PATENT OFFICE.

JOHN ROBBERT WEATHERSBY, OF MIDDLESEX, NORTH CAROLINA.

FARM-LEVEL.

1,346,619.  Specification of Letters Patent.  Patented July 13, 1920.

Application filed January 15, 1920. Serial No. 351,654.

*To all whom it may concern:*

Be it known that I, JOHN ROBBERT WEATHERSBY, a citizen of the United States of America, residing at Middlesex, in the county of Nash and State of North Carolina, have invented new and useful Improvements in Farm-Levels, of which the following is a specification.

The object of the invention is to provide a leveling apparatus of comparatively simple and substantial construction which may be used in leveling the surface or in determining the angle of general inclination of the surface of the soil on a farm or relatively large area of land for convenience in locating and building levees, farming irrigation trenches and the like, and with these objects in view the invention consists in a construction and combination of parts of which a preferred embodiment is shown in the accompanying drawing, wherein:

Figure 1 is a perspective view of the device.

Fig. 2 is a detail view showing one of the terminal seats for the level.

The illustrated construction contemplates the use of an ordinary carpenter's or mason's level indicated at 10 and having the spirit tube 11 provided with suitable adjacent graduations 12, and embodies a support for said level which consists of the bar 13 preferably having terminal transverse bearing plates 14 and a channeled metallic shoe 15 to protect the bar against injury by reason of contact with objects such as stones and the like, a rest bar 16 being supported in parallelism with and at an intermediate point of the length of said bar 13 by a suitable frame 17. This frame as shown, may consist of a plurality of intersecting braces 18 and suitable handholds or grips 19 may be attached thereto to facilitate the transportation of the apparatus from point to point as it may be required in determining the grade of the surface of the land. The rest bar 16 which is substantially held in a fixed position in relation to the main base bar 13 by reason of the interposed framework 17, is provided with seats 20 for the reception of and engagement with the extremities of the bar of the spirit level 10, said seats preferably being in the form of clamps and having spring fingers 21 which serve to frictionally engage the surfaces of said spirit level bar.

Obviously when the apparatus is not in use for the purpose indicated the spirit level may be removed therefrom to permit of its use in other relations and also to avoid the risk of injury to the tube thereof, or as will be obvious the device as described may be placed upon the market without the spirit level feature and adapted to have a level of the ordinary dimensions applied thereto by the user thereof as may be required in connection with work on the farm, the device in other respects being of a sufficiently substantial construction to adapt it to be stored in an outhouse or barn or wherever may be found convenient in the intervals between its periods of use as herein described.

What is claimed is:

1. A device for the purpose described having a main base beam, a rest bar arranged in parallelism with the said beam, a spacing frame between the rest bar and beam and provided with grips or handles, and means carried by the rest bar for engaging a spirit level.

2. A device for the purpose described having a base beam, a rest bar, a spacing frame securing the rest bar in parallelism with and spaced from said beam, seats consisting of spring clamping fingers carried by the rest bar, and a spirit level terminally engaged by said seats.

In testimony whereof I affix my signature.

JOHN ROBBERT WEATHERSBY.